June 10, 1930.  E. A. SPERRY  1,763,377
SOUNDING DEVICE
Original Filed Jan. 9, 1924   2 Sheets-Sheet 1
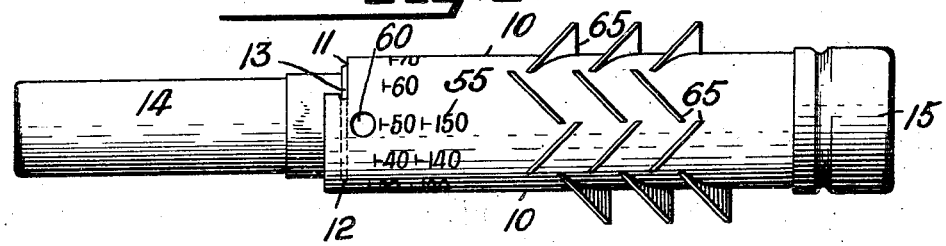
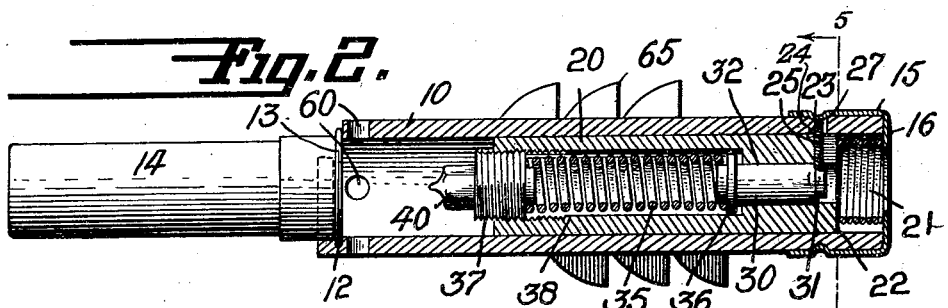
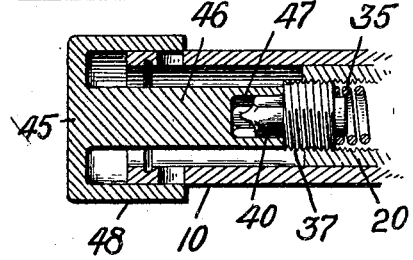
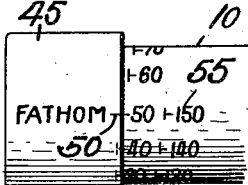
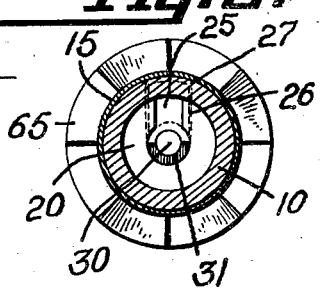
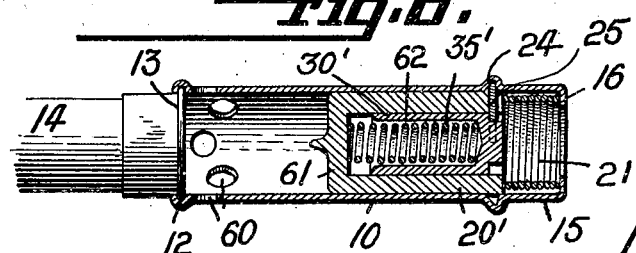
Inventor.
ELMER A. SPERRY.
By his Attorney
Herbert H. Thompson June 10, 1930.　　　E. A. SPERRY　　　1,763,377
SOUNDING DEVICE
Original Filed Jan. 9, 1924　　2 Sheets-Sheet 2
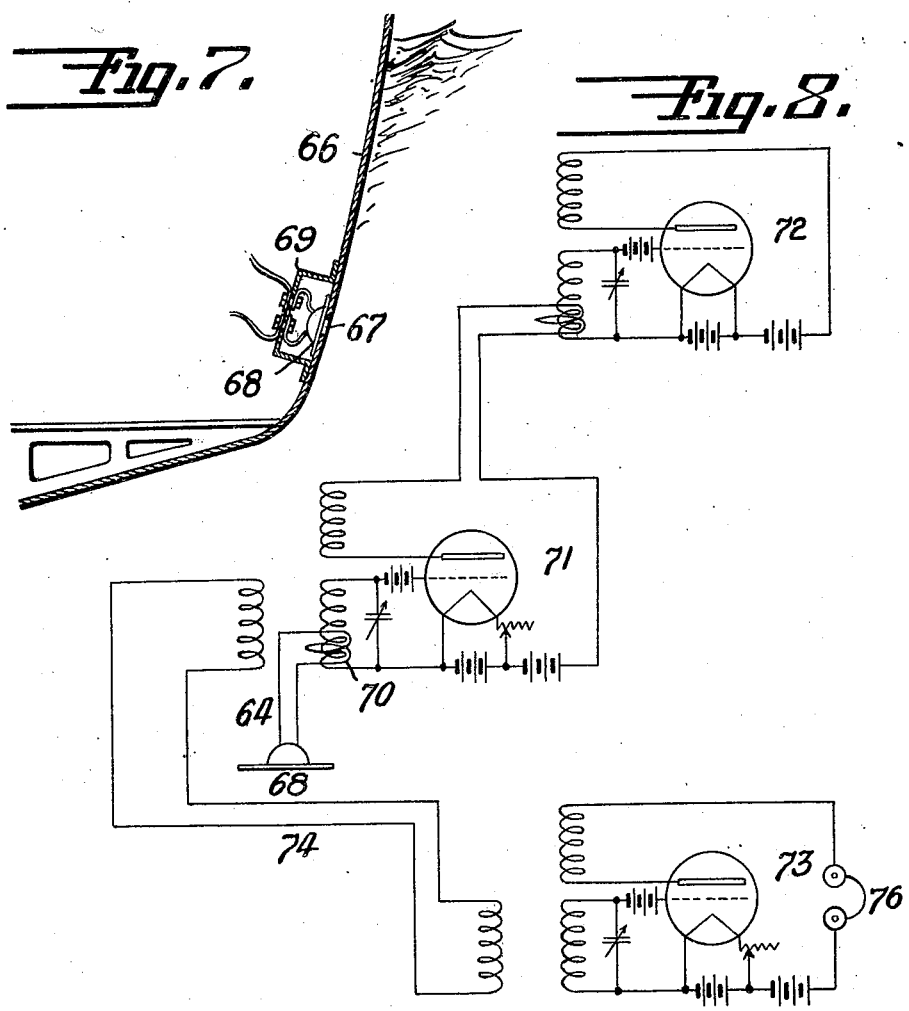
Inventor
ELMER A. SPERRY.
By 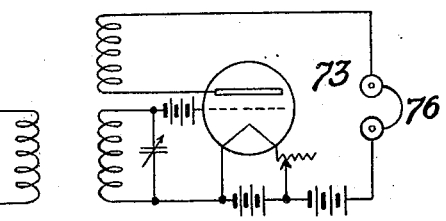

Patented June 10, 1930

1,763,377

UNITED STATES PATENT OFFICE

ELMER A. SPERRY, OF BROOKLYN, NEW YORK, ASSIGNOR, BY MESNE ASSIGNMENTS, TO SPERRY DEVELOPMENT COMPANY, A CORPORATION OF DELAWARE

SOUNDING DEVICE

Application filed January 9, 1924, Serial No. 685,271. Renewed October 29, 1929.

This invention relates to sounding devices for determining depth of a body of fluid at any desired place. It will become apparent from the description, however, that my invention has other uses.

In one form of my invention, wherein I employ the device as a sounder to determine depth of water, the invention comprises a depth charge which is thrown over-board and is designed to sink slowly. At a predetermined depth the cartridge, forming part of said device, is discharged so that the operator knows that the depth exceeds that certain predetermined value. If, however, the cartridge is not discharged, the depth of water, at that particular point, is less than the predetermined depth at which the device is set to explode. This depth may be the safe depth of water for a vessel or any other depth essential for any desired purpose.

This invention has for a further object the provision of means whereby the sounding device may be set to be discharged at any predetermined depth.

A further object of my invention is the provision of a sounding device, as described, which may employ as the explosive member thereof a standard form of cartridge.

A further object is the provision of means for preventing discharge of the cartridge due to striking the bottom before the predetermined depth has been reached.

A further object is the provision of means whereby the sounds produced beneath the surface of the water by the discharge of the cartridge may be rendered audible to an operator.

A further object of my invention contemplates its adaptation to the use of a cartridge that sets up vibrations which can not ordinarily be detected by the human senses, and means for transforming such vibrations into those to which the senses respond.

A further object of the invention is the provision of a sounding device, as described, which is simple in construction, certain in its operation, and inexpensive to manufacture.

It will be apparent from the description that although the invention is described as a sounding device for determining the depth of water, it may be readily adapted to any of the other uses as hereinbefore mentioned by changes consisting mainly in varying the size of the parts.

Other objects and advantages of this invention more or less broad than those hereinbefore stated, will be in part obvious and in part specifically referred to in the following detailed description.

In the accompanying drawings:

Fig. 1 is a side elevation of one embodiment of my invention.

Fig. 2 is a vertical section through the device, shown in Fig. 1.

Fig. 3 is a vertical section through a portion of the device, shown in Figs. 1 and 2, and showing means for setting the depth at which the bomb is to be discharged.

Fig. 4 is a view similar to Fig. 3 but not sectioned.

Fig. 5 is a vertical section taken on the line 5—5 of Fig. 2.

Fig. 6 is a vertical section of a modified form of my invention.

Fig. 7 is a view of a portion of a vessel having a vibration-responsive device applied thereto.

Fig. 8 is a diagrammatic representation of a vibration receiver and transformer.

Referring to Figs. 1 to 5 of the drawings, there is shown one form of my sounding device which consists essentially of a hollow cylinder 10, having a partially cut-out portion 11 at one end, the remaining portion of said end being provided with a circular groove 12, into which is adapted to seat the flange 13 at the base of a cartridge 14. At the other end of said cylinder 10 is adapted to be clamped a cap 15 having a flange 16 overlapping the open end of the cylinder 10. Within the hollow chamber of the cylinder 10 is designed to operate a striker 20, adapted to strike against the cartridge 14 at the proper time to discharge said cartridge. Said striker 20 is normally forced toward effective position to strike the cartridge by means of a heavy spring 21, positioned between the flange 16 and the end 22 of said striker. The latter, however, is held normally in retracted or ineffective position by means of a latch 25, slidable radially within a slot 26 extending radially through the striker head, and into a slot 27 in the wall of cylinder 10 (see Fig. 5). Said slot 27 is of sufficient size to permit the latch 25 to drop immediately, at the predetermined time, out of engagement with cylinder 10 and permit the spring 21 to move the striker 20 with relatively great force against the cartridge to discharge the latter.

The latch 25 is normally held in outward position in engagement with cylinder 10 by means of a plunger 30, having a circumferential shoulder 31 in which said latch 25 engages. The plunger 30 operates in a central bore 32, formed in the striker and is normally forced out of the striker by means of a spring 35 engaging a flange 36 at the inner end of said plunger 30 and a nut 37 in the opposite end of the striker, said spring being enclosed within a central bore 38, forming an extension of bore 32. The flange 36 limits the outward movement of plunger 30. It is obvious that until plunger 30 is pressed inwardly to a point where shoulder 31 is out of engagement with latch 25, said latch will be held in engagement with cylinder 10 to prevent movement of the striker 20 into engagement with the cartridge. When, however, the plunger 30 is moved inwardly to disengage latch 25, the latter drops out of engagement with the cylinder 10 and thereafter the spring 21 is free to move the striker 20 into engagement with the cartridge. The outer end of latch 25 is preferably beveled as at 23, and engages a similarly beveled face 24 in casing 10 so that a camming action is exerted upon the latch to facilitate the disengagement thereof from the casing.

The inward movement of plunger 30 is controlled by the depth of submergence. Obviously, therefore, if the water pressure upon the rear end of the plunger 30 exceeds the pressure of spring 35 upon the front end of said plunger, the latter will be moved forwardly out of the path of latch 25 to render the striker effective. It is apparent, therefore, that if the tension of spring 35 is varied, the depth of submergence at which the striker will be released and the cartridge discharged can be correspondingly varied at will. To permit setting the device so that it will discharge at a predetermined depth, the nut 37 is screw-threaded into the central bore 38 at the forward end of the striker, and is preferably provided with a polygonal projection 40, which may be engaged by a wrench to screw the bolt forwardly or rearwardly to decrease or increase, respectively, the tension of spring 35 and thus increase or decrease the depth at which the cartridge will be discharged.

For the purpose of adjusting the tension of the spring, I provide means such as a wrench or operating member 45, Fig. 3, having a central portion 46 provided with a polygonal bore 47 adapted to engage projection 40, said wrench 45 being also provided with a sleeve or flange 48, preferably formed integral with stem 46 and adapted to slidably engage the cylindrical casing 10. The sleeve 48 may have an index 50 thereon adapted to cooperate with a plurality of graduations 55, circumferentially arranged on casing 10, adjacent to said sleeve 48, so that the exact degree of adjustment described may readily be obtained. The graduations 55, may be in terms of feet or fathoms, at which it is desired to discharge the sounding device.

The casing 10 is provided, adjacent its forward end, with a plurality of openings 60 to allow the water or other fluid therein to be discharged as the striker moves forwardly. These openings are sufficiently large to permit free flow of water therethrough so that the forward movement of striker 20, when released, will not be appreciably retarded.

In assembling the device, the spring 21 is first inserted through the open forward end of casing 10 and allowed to rest upon flange 16. The striker 20 including the latch 25 is then inserted through the open forward end and is pressed rearwardly to compress spring 21 until the latch 25 is opposite the slot 26, whereupon said latch is moved, by means of some instrument inserted through the open rear end, outwardly into the slot 27 to permit plunger 32 to move forwardly until said latch rests upon the shoulder 31. The spring 21 is thus held under compression and the striker 20 is held in retracted position by the latch 25. The tension of spring 35 is now adjusted by means of wrench 45, so that the sounding device will discharge at the desired predetermined depth and thereafter the cartridge 14 is slid into position on the forward end of casing 10. The sounding device, as thus assembled, is thrown overboard. If the depth of water at that particular place exceeds the predetermined depth of explosion, the cartridge will be discharged, but if the depth is less than said predetermined depth, no discharge will take place. A plurality of depth charges may be thrown overboard until the depth of water, at any particular place, is determined with exactness.

In Fig. 6, I have illustrated a modified form of my invention, which is simplified by the omission of the adjusting mechanism in the Figures 1 to 5, modification. The forward end of the striker 25, is therefore, closed, as shown at 61 and instead of the adjustment hereinbefore described, springs 35' of known tension are employed. The length of the sounding device in this case may be decreased by positioning the spring in a cylindrical bore 62, formed within the plunger 30'. The operation of this form of the device, after being thrown overboard, is otherwise the same as hereinbefore described in connection with the Figures 1 to 5 modification.

The casing 10 may be provided with a plurality of fins or baffle members 65 adapted to retard the speed of descent of the device through the water to prevent discharge of the cartridge due to striking the bottom before reaching the predetermined depth for which the sounding device has been set.

If desired, the vibrations sent up by the discharge of the cartridge, may be of such nature as to be normally beyond the range of the senses of an observer but adapted to be brought within said range by some transforming device. Thus the cartridge may be adapted to explode with a sound that is beyond the range of the human ear, such as, for example, by a rate of vibration much higher than is audible to the human ear and is adapted to be received by a suitable transforming instrument of any known type for transforming frequencies, such as the wireless oscillating circuit type, or the vibrations may be received by suitable known instruments which respond to such vibrations.

In Figure 7 of the drawings, I have shown one suitable form of device for rendering audible normally inaudible sound vibrations generated by the discharge of the cartridge. For this purpose the hull 66 of the vessel may be provided with an opening 67, preferably below the water line and behind said opening is adapted to be positioned a diaphragm 68 to close the same, the ship being protected from leakage by means of a water-tight casing 69 surrounding said opening and said diaphragm. Said diaphragm may form part of a microphone or transmitter circuit 64 adapted to vary the current in a coil 70 which sets up oscillations of a given frequency in a wireless oscillating circuit 71 of the three-electrode vacuum bulb type. A second wireless oscillating circuit 72 of different frequency may be positioned to impress its frequency upon the first circuit and so form a series of beats in the well-known manner, said beats having a frequency considerably below that of either of the said oscillating circuits. Said beats are adapted to set up oscillations in a third oscillating circuit 73 by means of an induction circuit 74, or directly if desired, the frequency of said oscillations in circuit 73 being well within the audible range so that they may be detected through an ordinary ear phone 76.

It should be understood that the means hereinbefore described are merely illustrative of the general method which consists in producing vibrations normally beyond the range of the senses of an observer and providing suitable receiving and transforming mechanism for bringing said vibrations within said range.

Where the discharge of the cartridge sets up vibrations beneath the surface of the water which are within the range of the ear and it is desired to amplify the transmitted vibration to render them more distinctly audible to an observer, there may be employed a single oscillating circuit, such as the circuit 73, the transmitter circuit 64 being positioned to set up oscillations in the oscillating circuit.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Claims:

1. A sounding device, comprising a casing, a striker therein, a cartridge, means for holding said cartridge in cooperative relation to said striker, means tending to actuate said striker to discharge the cartridge, a freely slidable latch normally interposed between said casing and said striker for maintaining said striker in ineffective position, and means whereby the predetermined pressure of the water causes said latch to slide out of engagement with said casing to permit said second means to actuate said striker.

2. An explosive sounding device, comprising a striker, means tending to actuate said striker to discharge the device, means for maintaining said striker normally in ineffective position, comprising a latch, a member for holding said latch in effective position and a spring normally pressing said member to effective position, means whereby the pressure of the water, when greater than the spring pressure, renders said member and said latch ineffective and permits said striker to be actuated, a movable member engaging said spring and an operating member engageable with said movable member to move the latter and vary the tension of said spring to vary correspondingly the depth at which said striker is actuated.

3. An explosive sounding device, comprising a striker, means tending to actuate said striker to discharge the device, means for maintaining said striker normally in ineffective position, comprising a latch, a member for holding said latch in effective position and a spring normally pressing said member to effective position, means whereby the pressure of the water, when greater than the spring pressure, renders said member and said latch ineffective and permits said striker to be actuated, a movable member engaging said spring and an operating member engageable with said movable member whereby the depth at which said striker is actuated may be predetermined, said operating member and said device having co-operating indices for indicating said predetermined depth.

4. An explosive sounding device, comprising a striker, means tending to actuate said striker to discharge the device, means for maintaining said striker normally in ineffective position, comprising a latch, a member for holding said latch in effective position and a spring normally pressing said member to effective position, means whereby the pressure of the water, when greater than the spring pressure, renders said member and said latch ineffective and permits said striker to be actuated, a movable member engaging said spring and an operating member engageable with said movable member whereby the depth at which said striker is actuated may be predetermined, said device having a scale calibrated in terms of depth and said operating member having an index cooperating with said scale for indicating the predetermined depth.

5. In an explosive sounding device, a casing and a striker within said casing normally held in ineffective position at one end thereof and movable to an effective position at the other end thereof, said casing having a plurality of openings therethrough adjacent said other end to permit expulsion of fluid from the casing during the movement of the striker to effective position.

6. In combination, an explosive sounding device and means for preventing said device from striking the bottom beneath a body of water with sufficient impact to discharge the device.

7. In combination, an explosive sounding device and means for preventing said device from striking the bottom beneath a body of water with sufficient impact to discharge the device, said means comprising retarding means carried by said device.

8. In combination, an explosive sounding device and means for preventing said device from striking the bottom beneath a body of water with sufficient impact to discharge the device, said means comprising a plurality of fins carried by said device.

9. In combination, an explosive sounding device, means for predetermining the depth at which said device is to be discharged, and means for preventing discharge of said device before the predetermined depth is reached due to striking of the device on the bottom beneath a body of water.

10. In combination, an explosive sounding device, means for predetermining the depth at which said device is to be discharged, and retarding means carried by said device for preventing discharge of said device before the predetermined depth is reached due to striking of the device on the bottom beneath a body of water.

11. A sounding device comprising a casing, a striker therein, a cartridge, means for holding said cartridge in cooperative relation to said striker, means tending to actuate said striker to discharge the cartridge, a freely slidable latch normally interposed between said casing and striker for maintaining said striker in ineffective position, a member normally engaging said latch to prevent said latch from sliding out of engagement with said casing and releasing said striker, and means whereby said member is actuated upon predetermined pressure of the water to release said latch.

In testimony whereof I have affixed my signature.

ELMER A. SPERRY.